US006235231B1

(12) United States Patent
Martin

(10) Patent No.: US 6,235,231 B1
(45) Date of Patent: May 22, 2001

(54) PROCESS FOR PRODUCTION OF SHAFT PASSAGES IN A MOLDED PLASTIC PART

(75) Inventor: Gerard Martin, Rue Pietra Scritta (FR)

(73) Assignee: Mecaplast SAM, Monaco (FR)

( * ) Notice: Subject to any disclaimer, the term of this patent is extended or adjusted under 35 U.S.C. 154(b) by 0 days.

(21) Appl. No.: 09/192,580

(22) Filed: Nov. 17, 1998

(30) Foreign Application Priority Data

Nov. 17, 1997 (FR) .................................................. 97 14362

(51) Int. Cl.$^7$ .................................................. B29C 45/44
(52) U.S. Cl. ...................... 264/328.1; 264/334; 425/556; 425/577; 425/DIG. 58; 29/890.127
(58) Field of Search ..................... 264/313, 318, 264/328.1, 334; 425/577, 556, DIG. 58, 438, 441; 249/64; 29/890.127

(56) References Cited

U.S. PATENT DOCUMENTS

| | | | |
|---|---|---|---|
| 4,641,701 | * | 2/1987 | Yamamoto .............................. 164/90 |
| 4,695,421 | * | 9/1987 | Takeda .................................. 264/318 |
| 5,177,866 | * | 1/1993 | Bennett et al. .................. 29/890.127 |
| 5,403,179 | * | 4/1995 | Ramsey .................................. 425/577 |
| 5,715,782 | | 2/1998 | Elder . |
| 5,925,303 | * | 7/1999 | Scheliga ................................ 264/318 |

FOREIGN PATENT DOCUMENTS 0 701 057 A1   3/1996  (EP) .

OTHER PUBLICATIONS

Patent Abstracts of Japan, Pub. No. 60124218, "Molding Device for Synthetic Resin" (1985).

* cited by examiner

Primary Examiner—Jill L. Heitbrink
(74) Attorney, Agent, or Firm—Nixon & Vanderhye P.C.

(57) ABSTRACT

This invention relates to a process for production of shaft passages in a molded plastic part, a mold, and the use of the process of production in, for example, a flap device particularly for a feed system for internal combustion engines, characterized in that it consists of:

Figure 1:
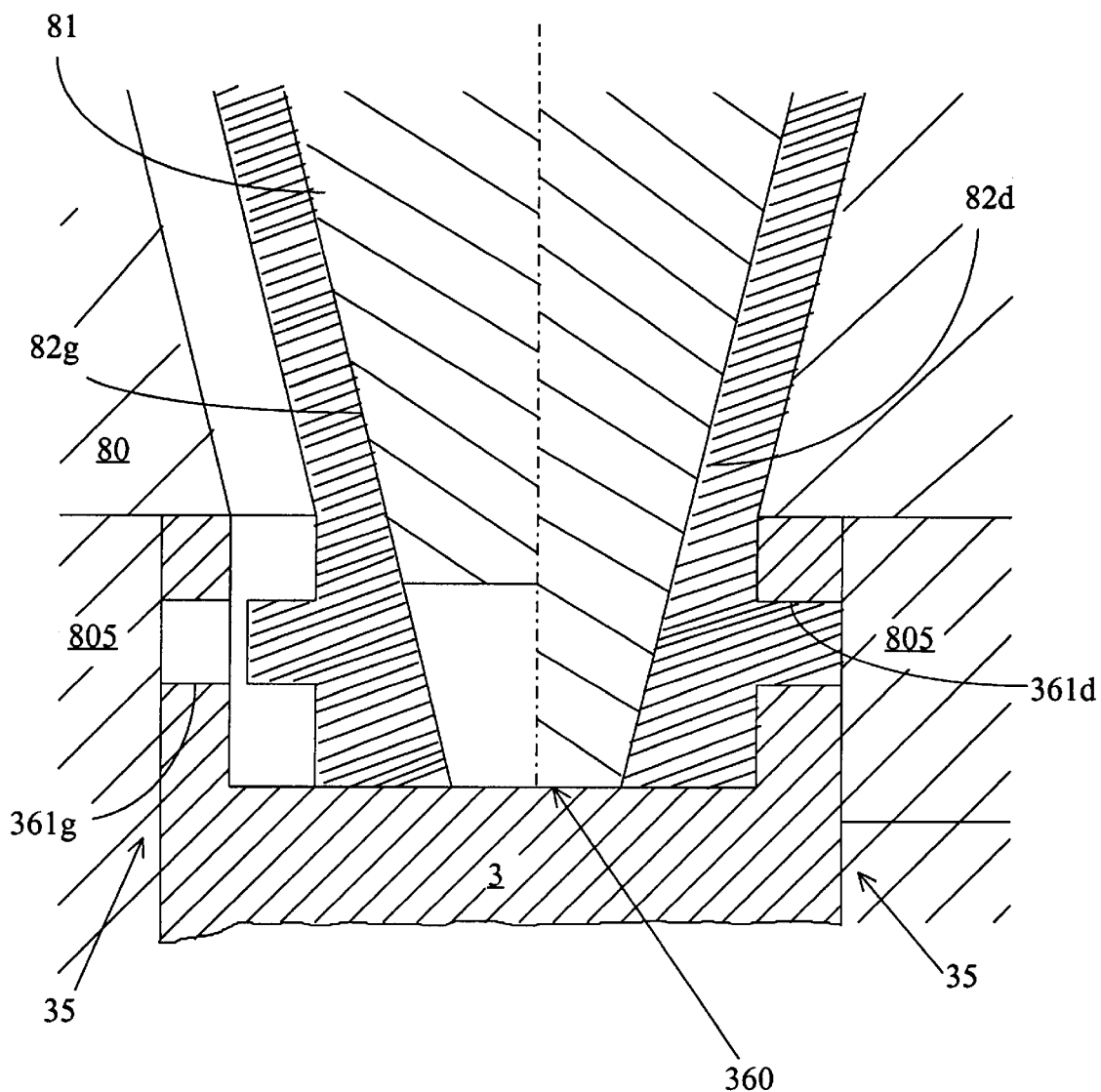

providing a recess by the advance of a slide of the molding tool between two adjacent bearings each associated with sites of different moving parts, and forming a bearing portion on each side of the sites of each moving part by a moving wedge relative to a slide, whereby the wedge carries a pin that is intended to form a bearing portion of one side of the moving part.

5 Claims, 9 Drawing Sheets

PROCESS FOR PRODUCTION OF SHAFT PASSAGES IN A MOLDED PLASTIC PART

FIELD OF THE INVENTION

This invention relates to a process for production of shaft passages in a plastic-molded part, the mold, and use of the process of production in a flap device, for example, for a feed system of internal combustion engines.

BACKGROUND OF THE INVENTION

Known in feeds for internal combustion engines are air intake pipes with pivoting flaps such as, for example, those taught by Patent Application EP 0 701057. This document teaches a pipe which for each combustion chamber comprises at least two air ducts, at least one of which is selectively closed by a flap that pivots around a shaft that is crosswise to the duct between an at least partially sealing position and a position for opening the duct. In this kind of device, according to the prior art, the metal-flap actuating shaft is mounted in the molded thermoplastic part that constitutes the body of the pipe with journals and rings that require gaskets to ensure the sealing of the shaft at the junction with the plastic parts.

In such a device, the rings can be equipped with flexible or elastically deformable means to limit the radial play of the shaft relative to the body of the thermoplastic device.

Taking into account this possible play, issues of alignment of shafts and of rotation of the shaft relative to the plastic part are dealt with by the additional parts. This has the drawback of requiring the production and installation of additional parts in the thermoplastic part. A first drawback is the increased production cost. In addition, this composition makes it necessary to provide hoods, mounting points, journals and barrels that can be attached to the main part by ultrasonic soldering or by locking. This latter solution does not necessarily ensure that the axis of rotation will be maintained properly relative to the body of the device.

In a variant embodiment of this prior art, the common drive shaft is flexible and comprises duplicate-molded drive segments that are separated by flexible portions. This flexibility facilitates installation by making it possible to compensate for the major misalignments of the cradles and barrels that form the bearings and the range of rotation of the various flaps. The problem of misalignment of the bearings is therefore known, and to date one skilled in the art has not found a satisfactory solution.

Today, to solve the problem of alignment of passages of pins in the successive bearings, several other solutions exist, but each of them has its drawbacks. To obtain the anticipated result, which is to be able to engage a rotating pin freely in the various bearings of a part that follows the same shaft, it is necessary that the passage holes be perfectly aligned if it is desired that this pin be able rotate freely. To do this, it is possible to duplicate-mold a pin that is then withdrawn; this leaves open the possibility of a non-alignment existing after the pin has been withdrawn owing to deformations due to internal tensions. It is also possible to pierce the part over its entire length. Considering the lengths in question, this leads to buckling of the drill, which does not make it possible to ensure perfect alignment. In any case, the machining embrittles the surface that is attacked by the drill. Finally, a last solution that corresponds to that of the European Patent is to study the part to produce it in several parts so that the bearings can be assembled in the molded part.

SUMMARY OF THE INVENTION

This invention has as its first object to solve this problem of aligning the bearings in a plastic molded part by means of a new production process.

This object is achieved by the fact that the process of producing the shaft passages in a molded-plastic part that at regular intervals comprises bearings for a shaft that is intended to actuate at least two moving parts that are attached to the shaft at given sites, whereby said shaft bearings are placed in the molded plastic part at sites that correspond to each side of the sites of moving parts, characterized in that said solution consists of providing a recess by the advance of a slide of the molding tool between two adjacent bearings that are each associated with the sites of different moving parts, and forming a bearing portion of each side of the sites of each moving part by a moving wedge relative to a slide, whereby the wedge carries a pin that is intended to form a bearing part of one side of the moving part.

According to another particular feature, the pin is integral with the wedge, which is interchangeable.

According to another particular feature, the pin can be adjusted and interchanged.

According to another particular feature, the pin is mounted in a cylindrical housing of the wedge with a cylindrical stud that is offset relative to the axis of symmetry of the pin and is immobilized in the desired position to ensure the alignment of the bearings with the other pins of the other wedges by attachment means that can be removed.

Another object of the invention is to propose a use of the process of the invention in the field of inlet systems for internal combustion engines.

This object is achieved by the fact that the process is used for the production of a flap device that is intended to be placed between the cylinder head and an air distributor system for internal combustion engines, whereby the distributor comprises a number of air ducts that are intended to empty into the combustion chambers, whereby the flap device makes it possible to reduce the air passage or passages between the distributor and the combustion chamber or chambers by the pivoting of the flaps, characterized in that the flap device comprises a molded plastic device body in which, from each side of each of the passages in which the flaps are placed, the bearings are formed directly in a single operation by molding, whereby said bearings of two different passages that are associated with two different flaps are separated by a recess.

According to another particular feature, the device is a flap flange that comprises a number of air passages that are separated from one another by a number of recesses, whereby the bearings are formed in the walls that are adjacent to the passages and to the recesses and a second injector passage empties into each of the passages that are below the plane that contains the shaft of the flaps, and parallel to the plane of the cylinder head.

According to another particular feature, the flange comprises chords that form two parallel planes that delimit the two ends of the passages, whereby these chords are equipped with insert attachment housings, whereby said inserts are threaded for the attachment of the distributor and are not threaded for the passage of the attachment bolts of the flange on the cylinder head.

According to another particular feature, the face of the chord that comprises the non-threaded inserts and is oriented toward the cylinder head is equipped with peripheral grooves in the passages to receive a seal.

According to another particular feature, the face of the chord opposite the distributor comprises an extension shaped like a half-shell that is intended to receive either a pneumatic lung for controlling the rotation of the shaft of the flap by negative pressure or an electrical system for controlling the rotation of the flap.

According to another particular feature, the flange is integrated into the manifold.

Another object of the invention is to propose a mold for production of shaft passages in a plastic part.

This object is achieved by the fact that the mold for production of shaft passages in a plastic part, characterized in that it comprises moving cores that are intended to form at least two passages in the part; at least one slide that controls the movements of two moving wedges that are integral with slides that are mounted to slide crosswise in the mold relative to the direction of vertical movement of the slide; whereby the movements of the moving wedges and the slides are controlled by respective pins that are placed on each side of the slide and oriented in two opposing angular directions relative to the vertical in such a way as to produce the desired movements; whereby each respective slide is intended to house between the reserved passages, in the part by the cores, recesses in which the bearings of a shaft are formed by pins that are mounted on the ends of the moving wedges on the face that is rotated toward the separating partition between the recess and the passage.

Figure 2A:
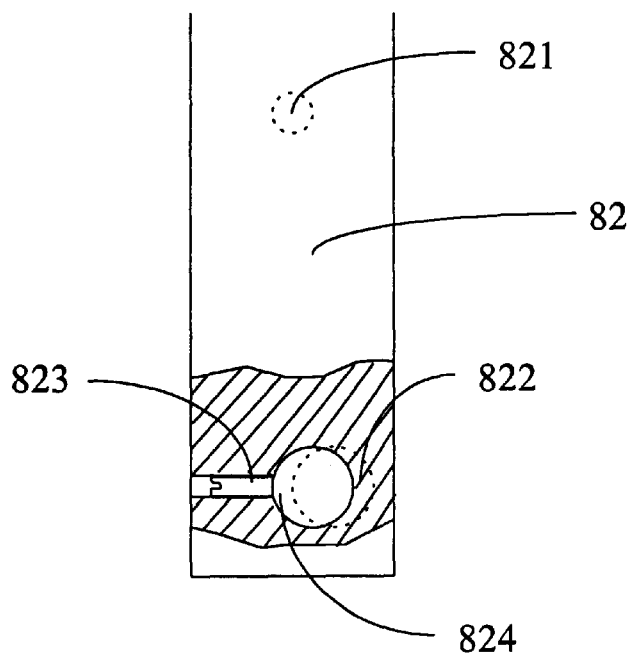
Figure 2B:
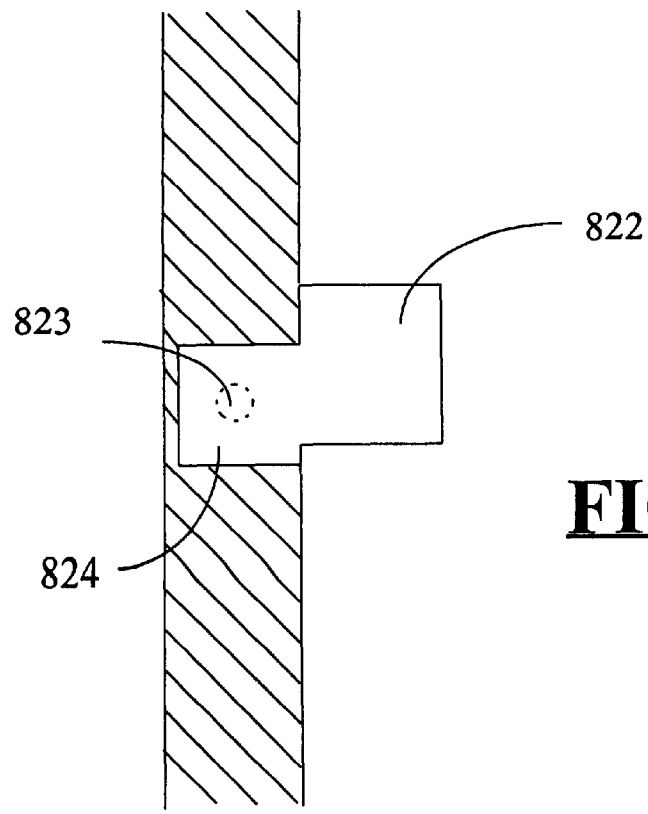
Figure 2C:
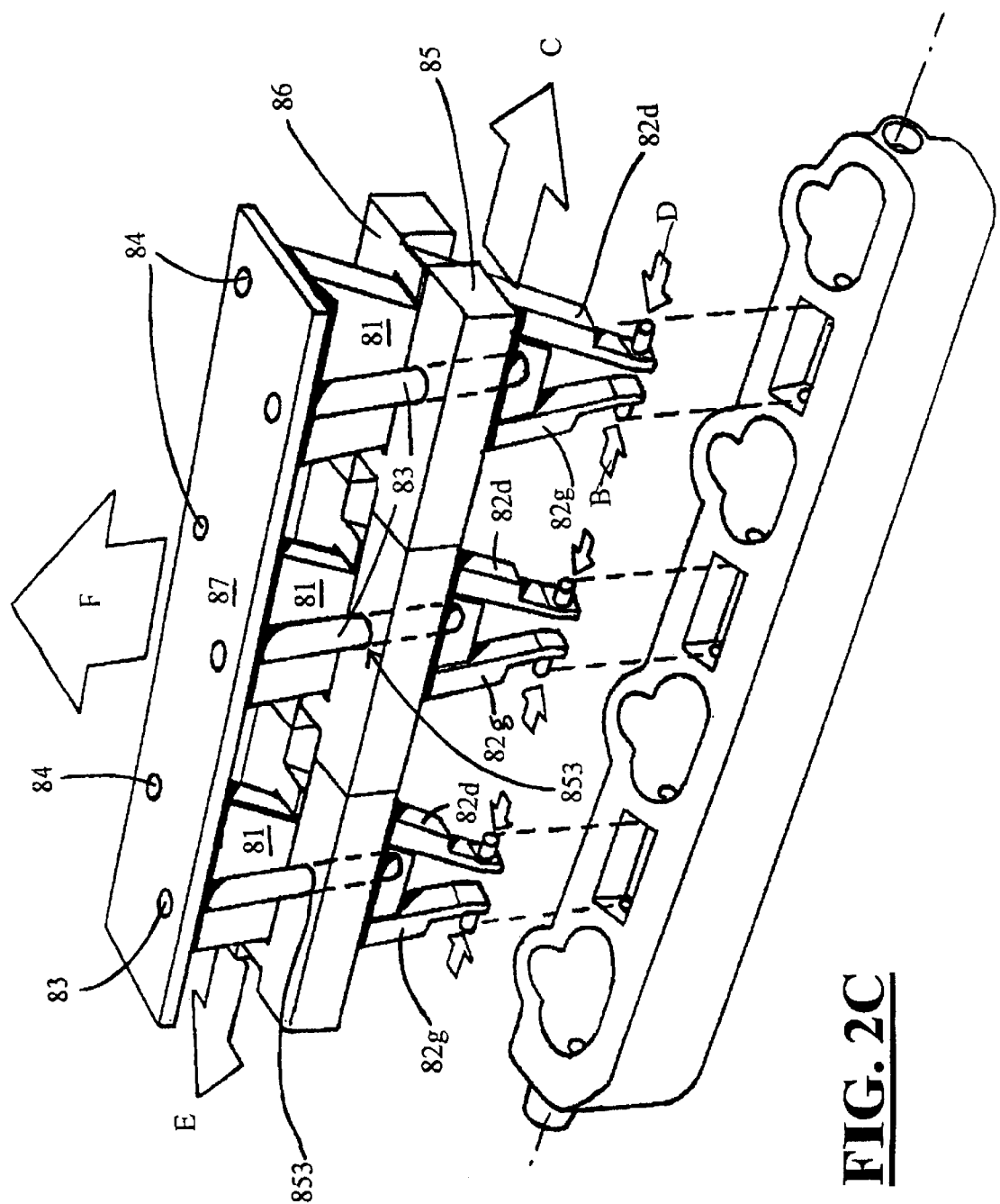
Figure 2D:
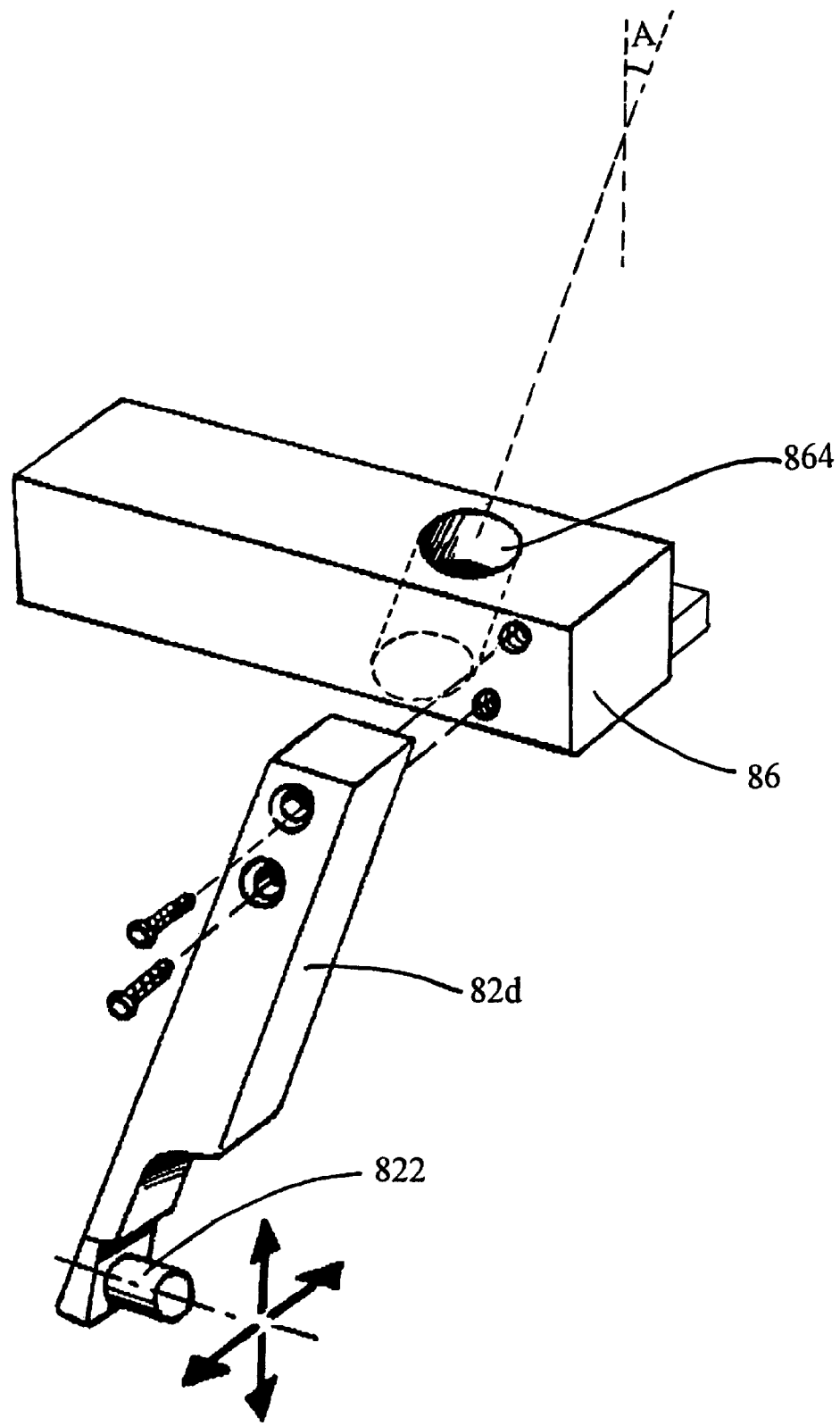
Figure 2E:
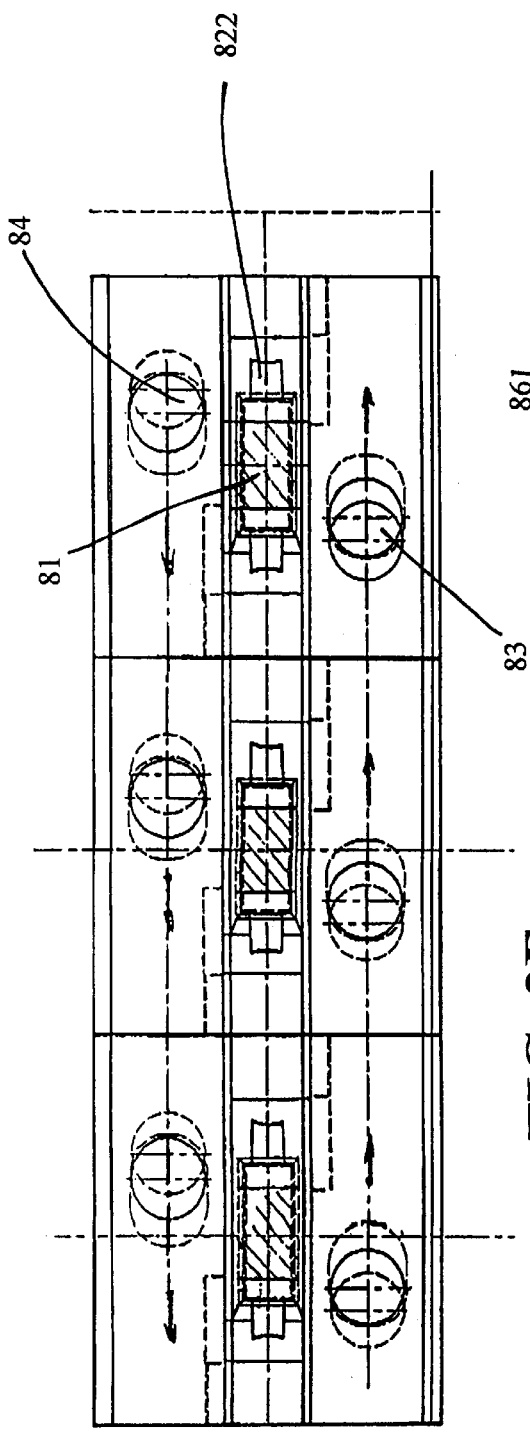
Figure 2F:
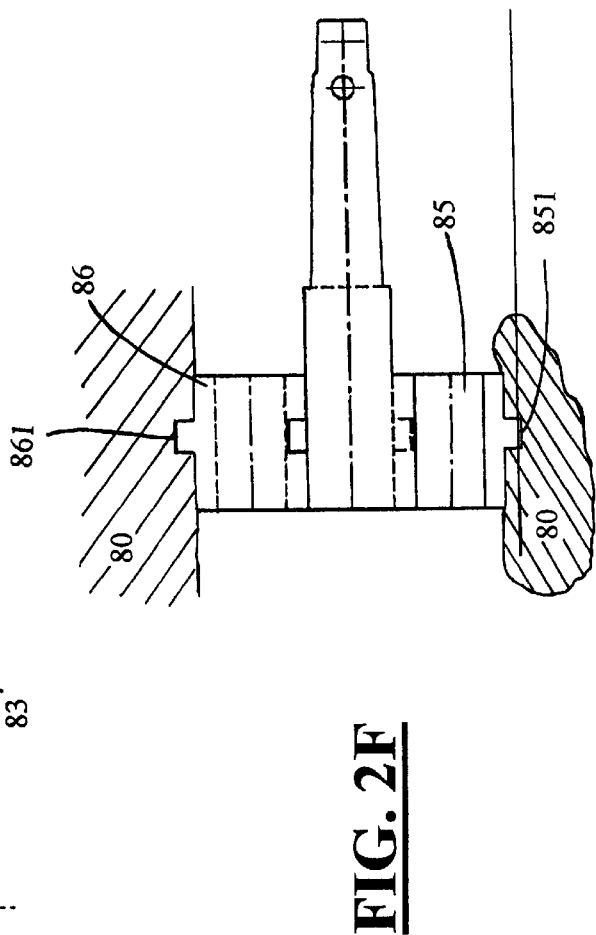
Figure 3A:
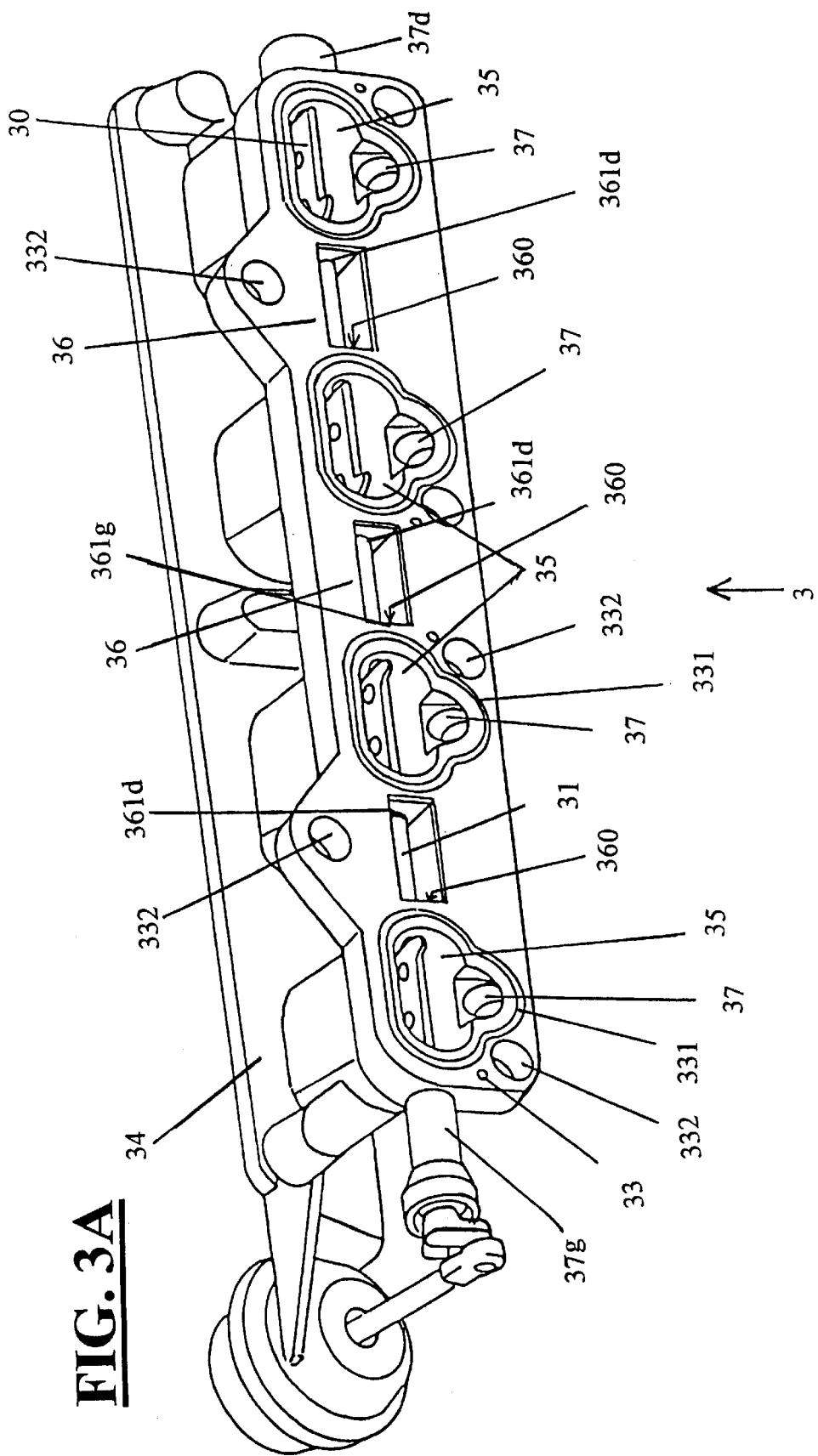
Figure 3B:
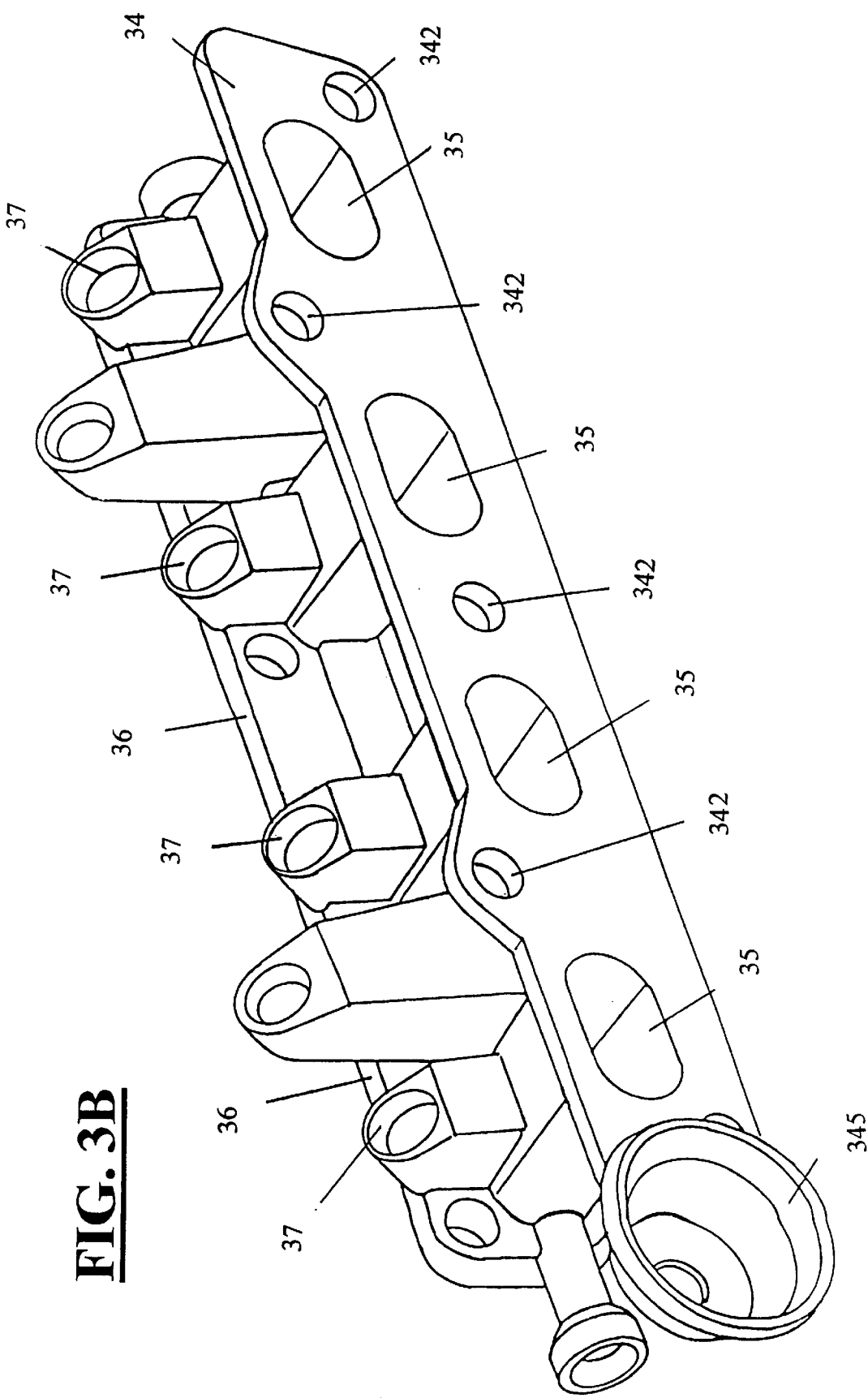
Figure 3C:
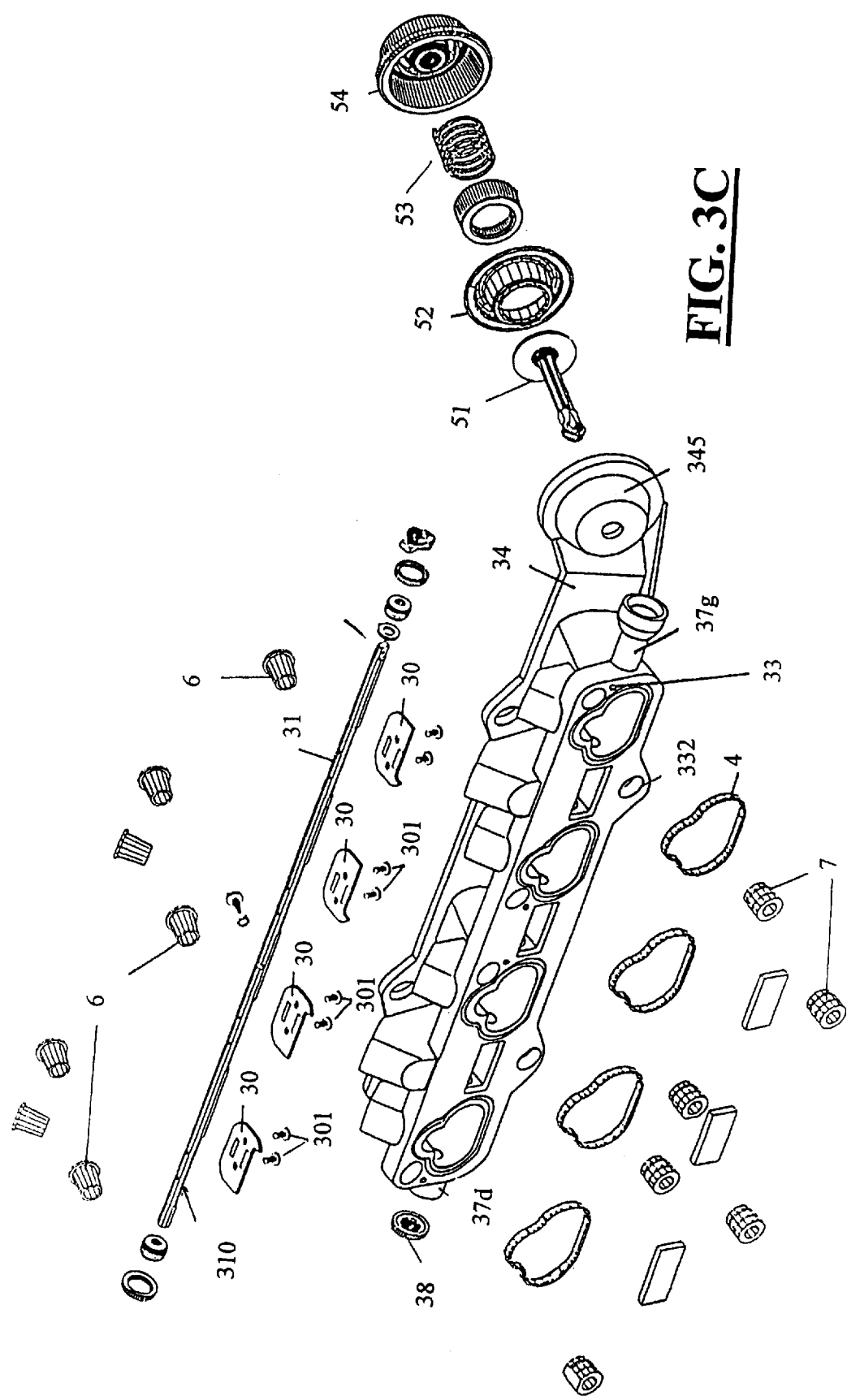
Figure 4:
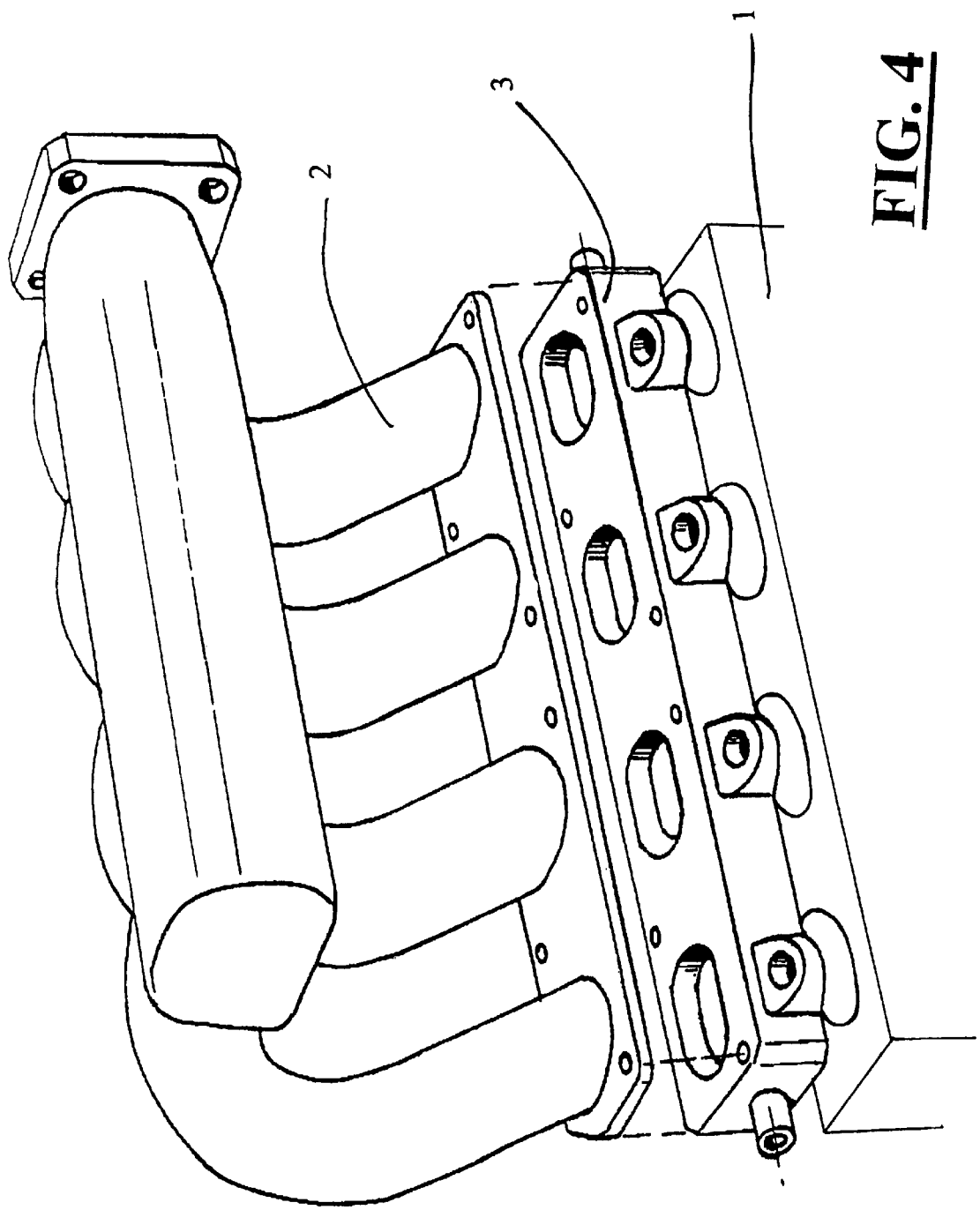

Other particular features and advantages of this invention will emerge more clearly from reading the description below, which is given with reference to the accompanying drawings where:

FIG. 1 presents a cutaway view of the device that makes possible the use of the process according to the invention;

FIG. 2A presents a side view in partial section of a moving wedge;

FIG. 2B presents a side view of a pin that is mounted in a moving wedge, in section;

FIG. 2C presents an exploded view of the molding system of bearings in the flange;

FIG. 2D presents a view in perspective of moving wedges associated with their slides;

FIG. 2E presents a bottom view of the system with moving wedges and a slide;

FIG. 2F presents a side view of the system with moving wedges;

FIG. 3A presents a view in perspective from the standpoint of its lower face of a flap flange in which the process of the invention is used;

FIG. 3B presents a view in perspective from the standpoint of its upper face of the same flap flange;

FIG. 3C presents an exploded view of the various components that are mounted in the flap flange;

FIG. 4 presents a view in perspective of the site of a flange in an internal combustion engine.

DETAILED DESCRIPTION OF THE PREFERRED EMBODIMENTS

An area of application of the invention relates to, for example, the internal combustion engines that are shown in FIG. 4, whose cylinder head (1) makes possible, by means of a device called a "flange" (3), communication between, on the one hand, the cylinders and the combustion chambers of the engine block and, on the other hand, the gas inlet device that consists of an intake pipe (2) or manifold. As shown in FIGS. 3A and 3C, said flange (3) can comprise a series of flaps (30) that are each attached by means of pairs of screws (301) to a flat surface (310) of a number of flat surfaces (310) that are formed on a shaft (31) that runs crosswise to flange (3). Flange (3) comprises a lower chord (33) and an upper chord (34), in which is formed each of the ends of passages (35) in which flaps (30) are placed that are intended to seal these passages partially or completely. Said passages (35) empty into the planes of lower chords (33) and upper chords (34). The plastic walls that delimit these passages (35) are linked to one another by a brace (36) in each of which a recess (360) is formed. The walls that separate recesses (360) and tubular passages (35) comprise left holes (361 g) and right holes (361 d) that constitute bearings for shaft (31) for controlling the rotation of flaps (30). At each end of flange (3) a left barrel (37 g) and right barrel (37 d) are formed. Right barrel (37 d) is sealed by a plug (38). At the periphery of each tubular passage (35), lower chord (33) is equipped with a groove (331) that is intended to receive a seal (4). Passages (332) in lower chord (33) make it possible to install inserts (7) and passages for the attachment bolts of flange (3) on cylinder head (1).

Passages (342) in upper chord (34) for attaching the flange to distributor (2) make it possible to install threaded inserts (6) that are intended to receive the threaded ends of the attachment bolts of distributor (2). Said upper chord (34) comprises an extension above the end of left barrel (37 g). This extension forms a housing in the shape of a half-shell (345) to constitute the lower half-housing of a negative-pressure pneumatic lung that comprises, as shown in FIG. 3C, an actuating rod (51) that is connected by a crank to the end of rod (31) that forms the shaft for controlling the rotation of the flaps. Said rod (51) is actuated by a membrane (52) that is continuously pushed toward its rest position resting against bottom (345) by one end of a spring (53), whose other end rests on the internal surface of cover (54) that forms the upper half-housing. Finally, flange (3) comprises a second series of passages (37) whose shafts are located on the same plane and converge relative to the shafts of passages (35) to empty into the latter (35) (as shown in FIG. 3A) via a housing that is provided below the level in which rotation shaft (31) is mounted. Part (3) is formed in a single molding operation. The holding bearings of shaft (31) that allow this shaft to rotate are to be produced in the same molding operation and are produced in such a way that their perfect alignment makes it possible to install the shaft without any problems and without having to resort to a flexible-type shaft. To do this, in this kind of part, the process of the invention that is shown in FIGS. 1 to 2B is used. FIG. 1 shows in section a view of recess (360) that is created in part (3) between two adjacent passages (35). Said recess (360), which empties into passages (35) through holes (361 g and 361 d) that form bearings, is created during the molding operation. Mold (80) makes possible the advance of a slide (81), which, once in position, preserves recesses (360) in part (3). With the aid of means, the injection press controls the movement of moving wedges (82 g, 82 d). On their faces that are rotated toward passages (35), said moving wedges are equipped with a pin (822) that is intended to form corresponding respective bearing (361 g, 361 d). The installation of the moving wedges is controlled by a system of pins (821, FIG. 2A) that are guided in grooves that are provided for this purpose in slide (81). Said moving wedges (82 g, 82 d) can be modified to adjust the positions and sizes of the holes of passages (361 g, 361 d) that are maintained in the material. The modification of the position of pin (822) of one or more wedges relative to the others makes it possible to ensure perfect alignment between the different bearings that are thus produced in each of the walls that separate a passage (35) from a recess (360). It is quite evident that a single slide is shown, but the mold comprises as many slides as there are intervals between two passages.

As can be seen in FIG. 2C, left moving wedges (82 *g*) and respectively right moving wedges (82 *d*) are each associated respectively with a left slide (85) and right slide (86) in which left holes (853) and respectively right holes (864) are formed.

Rods (83) that are attached to a chord (87) with an inclination of angle A in the counterclockwise direction relative to the vertical run through holes (853) of left slides (85).

Likewise, rods (84) that are mounted on a chord with an inclination of angle A in the clockwise direction relative to the vertical pass through holes (864). The holes in the respective slides are oriented at the same angles as the rods. Each slide (81) is also mounted integrally with chord (87), whose motion is actuated in a vertical movement in the body of mold (80). As can be seen in FIG. 2F, on its lateral surface opposite to the moving wedges each left slide (85) and/or right slide (86) comprises a groove (851) or (861) that is guided in a respective groove that is formed in the body of mold (80) to make possible the movements of left wedges along arrow B, right wedges as indicated by arrow D, during movement of the left slide as indicated by arrow C and of the right slide as indicated by arrow E. This movement is brought about during the descent of tapered slide (81), and in this case, the movements of the wedges are oriented in the direction opposite that of the arrows. During the movement of the slide that is controlled by chord (87) in the direction of arrow F, left rod (83) and/or right rod (84) cause the movement of left slides (85) as indicated by arrow C and/or right slides (86) as indicated by arrow E.

In a variant, the moving wedge can be equipped with a pin (822) that is mounted in the wedge with an eccentric (824) whose position, once established, is maintained by a locking screw (823). By loosening locking screw (823) and by making pin (822) turn by rotating eccentric (824) in its housing that is maintained in plate (82) that forms the moving wedge, the position of passage (361 *d* or 361 *g*) that is maintained in the partition is thus adjusted. This provides an easy way of adjusting alignments, and once the mold is adjusted, series production can be initiated.

In a variant of the invention, the moving wedges can be provided in the cylindrical cores that form passages (35). In this case, the slide that forms the recesses will not comprise moving wedges.

In another variant of the invention, the flange is integrated into the manifold.

What is claimed is:

1. A process for producing shaft bearings in a molded plastic part using a molding tool, wherein the molded plastic part comprises, at regular intervals, bearings for a rotating shaft that actuates at least two moving parts that are attached to the shaft at given spaced apart moving part sites so that said shaft bearings are located in the molded plastic part at bearing sites so that each side of a moving part site is defined by a bearing site, wherein the process comprises:

providing a recess in the molded plastic part by advancing a slide of the molding tool between two adjacent moving part sites, and forming a portion of a shaft bearing for supporting the rotating shaft on each side of the recess so as to form first and second bearing portions for said shaft on opposite sides of the recess that correspond to first and second moving parts on the shaft, respectively, by moving a wedge relative to the slide so that the wedge forces outwardly at least one pin that forms a bearing portion on one side of the recess.

2. Process according to claim 1, wherein the pin is integral with the wedge that is interchangeable.

3. Process according to claim 1, wherein the pin is adjustable and interchangeable.

4. Process according to claim 1, wherein the pin is mounted in a cylindrical housing of the wedge by means of a cylindrical stud that is offset relative to the axis of symmetry of the pin and is immobilized in a desired position to ensure the alignment of the bearings with other pins of other wedges by attachment means that can be removed.

5. The process of claim 1, further comprising mounting the shaft in the first and second bearing portions so that said bearing portions support said shaft when said shaft rotates.

* * * * *